United States Patent
Ho et al.

(10) Patent No.: US 8,292,613 B2
(45) Date of Patent: Oct. 23, 2012

(54) RUNNER SYSTEM FOR SUPPLYING MOLDING COMPOUND

(75) Inventors: Shu Chuen Ho, Singapore (SG); Si Liang Lu, Singapore (SG); Swee Kwong Mok, Singapore (SG); Kar Weng Yan, Singapore (SG)

(73) Assignee: ASM Technology Singapore Pte Ltd, Singapore (SG)

( * ) Notice: Subject to any disclaimer, the term of this patent is extended or adjusted under 35 U.S.C. 154(b) by 89 days.

(21) Appl. No.: 13/036,078

(22) Filed: Feb. 28, 2011

(65) Prior Publication Data

US 2011/0212214 A1   Sep. 1, 2011

Related U.S. Application Data

(60) Provisional application No. 61/309,106, filed on Mar. 1, 2010.

(51) Int. Cl.
*B29C 45/02* (2006.01)

(52) U.S. Cl. ............... 425/572; 264/328.8; 264/328.12; 264/328.13

(58) Field of Classification Search .................. 425/572, 425/588; 264/328.8, 328.12, 328.13
See application file for complete search history.

(56) References Cited

U.S. PATENT DOCUMENTS

| 4,909,725 | A | * | 3/1990 | Ward | 425/562 |
|---|---|---|---|---|---|
| 5,204,122 | A | * | 4/1993 | Konishi | 425/116 |
| 5,656,307 | A | * | 8/1997 | Naito et al. | 425/572 |
| 5,846,472 | A | * | 12/1998 | Rozema et al. | 264/297.2 |
| 5,851,559 | A | * | 12/1998 | Scribner et al. | 425/116 |
| 6,241,508 | B1 | * | 6/2001 | John et al. | 425/559 |
| 6,257,857 | B1 | * | 7/2001 | Lee et al. | 425/121 |
| 7,299,544 | B2 | * | 11/2007 | Lee | 29/762 |
| 2001/0018109 | A1 | * | 8/2001 | Lee et al. | 428/72 |
| 2004/0214371 | A1 | * | 10/2004 | Mahmood | 438/106 |
| 2007/0087079 | A1 | * | 4/2007 | Murugan | 425/572 |
| 2007/0090565 | A1 | * | 4/2007 | Ochi | 264/272.11 |
| 2010/0090357 | A1 | * | 4/2010 | Ho et al. | 264/1.1 |

* cited by examiner

*Primary Examiner* — Tim Heitbrink
(74) *Attorney, Agent, or Firm* — Ostrolenk Faber LLP

(57) ABSTRACT

A runner system for a molding apparatus comprises a plurality of runner networks, each runner network further comprising a mold supply pot having a first side and a second side opposite to the first side. A plurality of molding cavities are located on the first and second sides of the mold supply pot, and a plurality of runners are operative to channel molding compound from each mold supply pot to the plurality of molding cavities. At least one of the mold supply pots comprises a different number of runners located on the first side which are connected to the mold supply pot as compared to a number of runners located on the second side which are connected to the mold supply pot.

11 Claims, 2 Drawing Sheets

RUNNER SYSTEM FOR SUPPLYING MOLDING COMPOUND

FIELD OF THE INVENTION

The invention relates to the molding of electronic devices, and in particular to an arrangement of runners for supplying molding compound for molding electronic devices.

BACKGROUND AND PRIOR ART

During the assembly of semiconductor packages, semiconductor chips are often attached onto carriers, such as substrates or leadframes, for processing multiple semiconductor chips at the same time. After or during attachment, electrical connections are made between electrical pads on the chips to corresponding contacts or connection pads on the substrates or leadframes. This can be done by wire bonding, or the electrical pads can be directly attached onto the contacts on the substrates or leadframes. Thereafter, it is usually necessary to protect the chips and the electrical connections from the environment by encapsulating them in a molding compound, such as epoxy molding compound ("EMC").

In a typical transfer molding process, a substrate with the chips attached is placed into a molding system comprising top and bottom molding halves and sometimes, a middle plate. Multiple molding cavities are formed in one or both of the mold halves corresponding to molding positions where the chips to be encapsulated are located. Molding compound is introduced via mold supply pots in the molding system, and the mold supply pots are linked to the molding cavities through a system of runners and gates through which the molding compound is channeled before entering the molding cavities. A plunger is insertable into each mold supply pot and the molding compound is distributed from the mold supply pot upon compression by the plunger. After the cavities have been filled, the molding compound is allowed to set and harden.

A typical molding system 10' has multiple runner networks 12' with individual runners 16' symmetrically arranged on opposite sides of each mold supply pot 14' as shown in FIG. 1. For efficiency, at least two runners 16' are connected to each mold supply pot 14' on both sides of the mold supply pot 14. The numbers and cross-sectional areas of all the runners 16' linked to each mold supply pot 14' are the same, and there are typically an even number of runners 16' on opposite sides of the mold supply pot 14' which connect the mold supply pot 14' to molding cavities 15'. Such uniformity of the runners 16' permit a constant mold packing pressure in the liquid molding compound during transfer molding throughout each runner 16'. However, there is a constraint in spatial distribution of the molding system 10' which limits the types of substrates that may be molded. For example, where a pair of runners 16' is located on each side of the mold supply pot 14', only substrates that have an even number of columns of molding positions can be molded. The difficulty is accentuated when the number of columns is a prime number which is not divisible by any other integer except the integer itself. It is desirable to devise a runner system which can incorporate odd numbers or prime numbers of runners on opposite sides of the mold supply pot 14' to improve molding versatility.

SUMMARY OF THE INVENTION

It is thus an object of the invention to seek to provide an improved arrangement in the runner system to increase the flexibility of the molding system to mold different types of substrates so as to achieve greater versatility as compared to the prior art.

According to a first aspect of the invention, there is provided a runner system for a molding apparatus, comprising: a plurality of runner networks, each runner network further comprising a mold supply pot having a first side and a second side opposite to the first side; a plurality of molding cavities on the first and second sides of the mold supply pot; and a plurality of runners for channeling molding compound from each mold supply pot to the plurality of molding cavities; wherein at least one of the mold supply pots comprises a different number of runners located on the first side which are connected to the mold supply pot as compared to a number of runners located on the second side which are connected to the mold supply pot.

According to a second aspect of the invention, there is provided a molding apparatus comprising: a row of multiple mold supply pots; a plurality of columns of molding cavities arranged orthogonally to the row of mold supply pots located on first and second sides of the row of mold supply pots; networks of runners connecting the mold supply pots to the plurality of molding cavities, each runner connecting a mold supply pot to a column of multiple molding cavities; and wherein an odd number of runners corresponding to an odd number of columns of molding cavities are located on each of the first and second sides of the row of mold supply pots.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of the preferred embodiment of the invention when considered with the accompanying drawings, in which.

DETAILED DESCRIPTION OF THE PREFERRED EMBODIMENT OF THE INVENTION

Figure 1:
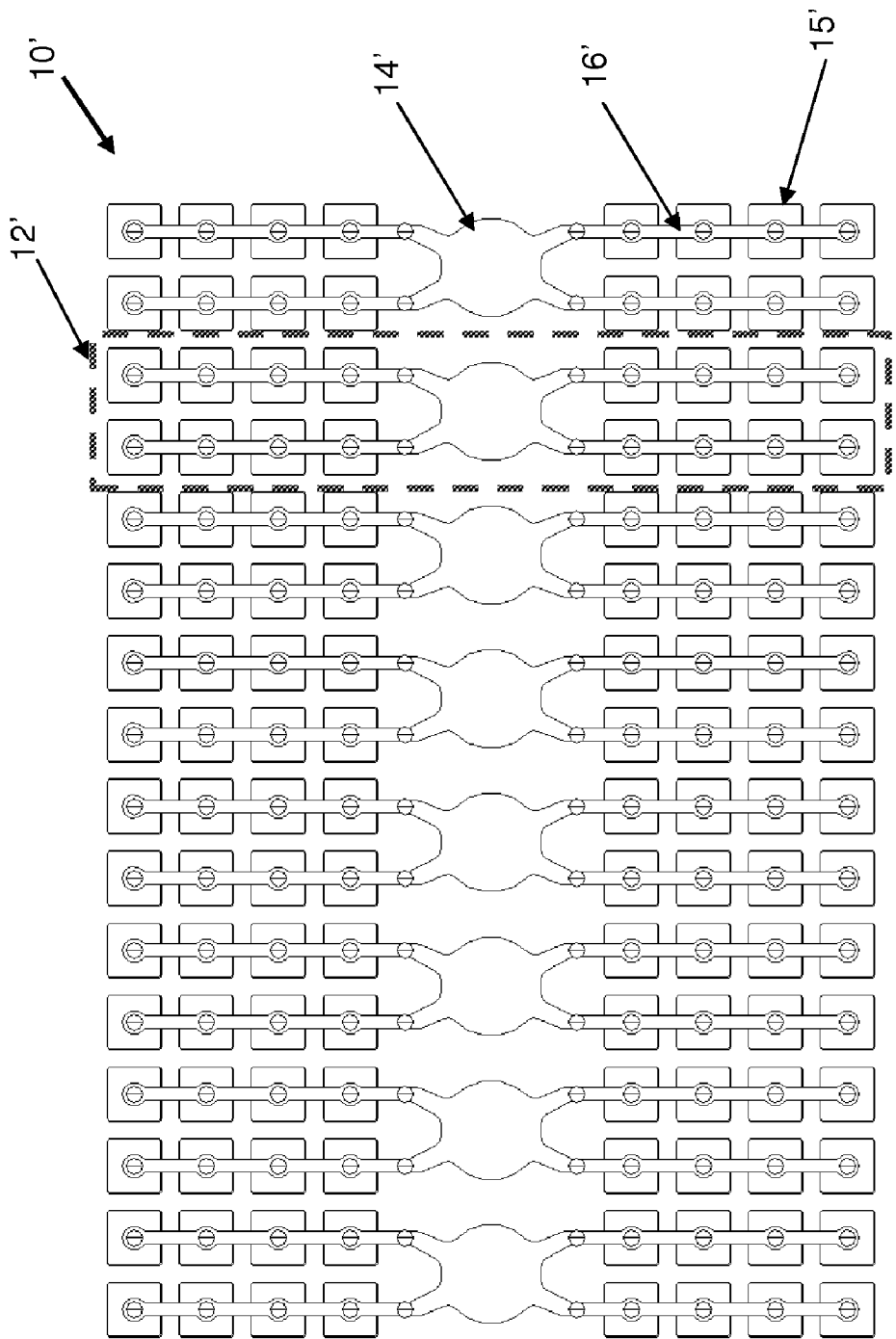
FIG. 1 is a plan view of a conventional runner system comprising runners linked to multiple mold supply pots.
Figure 2:
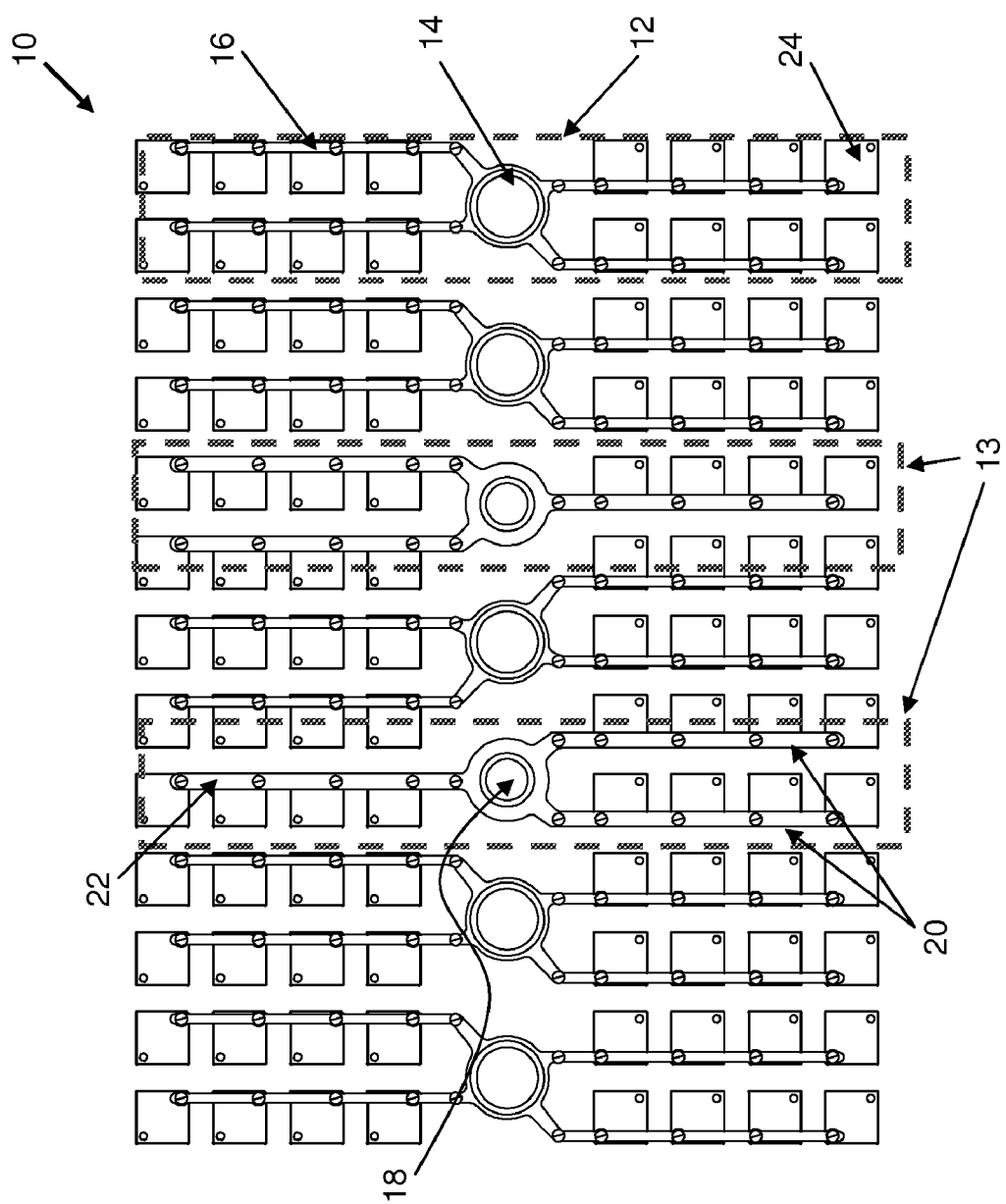
FIG. 2 is a plan view of a runner system according to the preferred embodiment of the invention which is applicable for molding a substrate with an odd number of columns of molding positions.

FIG. 2 is a plan view of a runner system 10 according to the preferred embodiment of the invention which is applicable for molding a substrate with an odd number of columns of molding positions, as signified by molding cavities 24. There is a row of multiple mold supply pots 14, 18 and a plurality of columns of molding cavities 24 arranged orthogonally to the row of mold supply pots 14, 18 located on first and second sides of the row of mold supply pots 14, 18.

A first runner network 12 has a typical symmetrically-arranged pair of runners 16 located on each side of a mold supply pot 14. There are thus an equal number of runners 16 on opposite first and second sides of the said mold supply pot 14 for carrying molding compound to each molding cavity 24 in which an electronic component is located and molded.

Additionally, a second runner network 13 has asymmetrically-arranged runners 20, 22 with an unequal number of runners 20, 22 on opposite sides of the mold supply pot 18. By incorporating the second runner network 13 into the runner system 10, an odd number of runners 22 can be connected on one side of the mold supply pot 18, while an even number of runners 20 can be connected on an opposite side of the mold supply pot 18. In the preferred embodiment, there is a single runner 22 on one side of the mold supply pot 18, and a pair of runners 20 on the opposite side of the mold supply pot 18 which are connected to the mold supply pot 18. This results in an asymmetrically-arranged runner system 10. The advantage of this runner system 10 is that substrates with an odd number of columns of molding positions can be accommodated.

Accordingly, as illustrated in FIG. 2, there are a total of thirteen columns of molding cavities 24, thirteen being a prime number. To achieve the aforesaid arrangement, the cross-sectional areas of the respective runners 20, 22 on either side of the mold supply pot 18 in the second runner network 13 are not the same. In the case where there is a symmetrical runner network 12, all the runners 16 have the same cross-sectional areas to achieve an equal mold packing pressure along each branch of runners 16. However, when having different numbers of runners 20, 22 on opposite sides of the mold supply pot 18, the amount of mold packing pressure along each runner 20, 22 is controlled by changing the cross-sectional area of the runner 20, 22. Therefore, a single runner 22 on one side of the mold supply port 18 will have a larger cross-sectional area than a pair of runners 20 on the opposite side of the mold supply port 18. Generally, the runners 20, 22 are configured such that a total volume of the runner(s) 20 of the runner system 13 on one side of the mold supply pot 18 will be the same as a total volume of the runner(s) 22 on the opposite side of the mold supply pot 18, to ensure that the mold packing pressures for all the molding cavities 24 are substantially uniform.

Thus, it would be appreciated that the asymmetrical runners allow flexibility in incorporating odd columns of molding positions into the molding apparatus with the said flexible runner system. In particular, substrates can be molded even if the number of columns of molding positions is a prime number.

The invention described herein is susceptible to variations, modifications and/or additions other than those specifically described and it is to be understood that the invention includes all such variations, modifications and/or additions which fall within the spirit and scope of the above description.

The invention claimed is:

1. A runner system for a molding apparatus, comprising:
    a plurality of runner networks, each runner network further comprising a mold supply pot having a first side and a second side opposite to the first side;
    a plurality of molding cavities on the first and second sides of the mold supply pot; and
    a plurality of runners for channeling molding compound from each mold supply pot to the plurality of molding cavities;
    wherein at least one of the mold supply pots comprises a different number of runners located on the first side which are connected to the mold supply pot as compared to a number of runners located on the second side which are connected to the mold supply pot.

2. The runner system as claimed in claim 1, wherein there are an even number of runners located on the first side of the mold supply pot and an odd number of runners located on the second side of the mold supply pot.

3. The runner system as claimed in claim 2, wherein the number of runners comprised in the odd number of runners is a prime number.

4. The runner system as claimed in claim 1, wherein the runners on the first side of the mold supply pot have different cross-sectional areas from the runners on the second side of the mold supply pot.

5. The runner system as claimed in claim 4, wherein the cross-sectional area of each runner comprised in the odd number of runners is larger than the cross-sectional area of each runner comprised in the even number of runners.

6. A molding apparatus comprising:
    a row of multiple mold supply pots;
    a plurality of columns of molding cavities arranged orthogonally to the row of mold supply pots located on first and second sides of the row of mold supply pots;
    networks of runners connecting the mold supply pots to the plurality of molding cavities, each runner connecting a mold supply pot to a column of multiple molding cavities; and
    wherein an odd number of runners corresponding to an odd number of columns of molding cavities are located on each of the first and second sides of the row of mold supply pots.

7. The molding apparatus as claimed in claim 6, wherein at least one of the mold supply pots has a different number of runners located on the first side which are connected to the mold supply pot as compared to a number of runners located on the second side which are connected to the mold supply pot.

8. The molding apparatus as claimed in claim 7, wherein there are an even number of runners located on the first side of the mold supply pot and an odd number of runners located on the second side of the mold supply pot.

9. The molding apparatus as claimed in claim 8, wherein the number of runners comprised in the odd number of runners is a prime number.

10. The molding apparatus as claimed in claim 7, wherein the runners on the first side of the mold supply pot have different cross-sectional areas from the runners on the second side of the mold supply pot.

11. The molding apparatus as claimed in claim 8, wherein the cross-sectional area of each runner comprised in the odd number of runners is larger than the cross-sectional area of each runner comprised in the even number of runners.

* * * * *